(12) United States Patent
Spiegel

(10) Patent No.: US 9,423,284 B2
(45) Date of Patent: Aug. 23, 2016

(54) METHOD AND APPARATUS FOR FUNCTION TESTING OF PLASTIC CONTAINERS PRODUCED IN AN EXTRUSION BLOW MOLDING METHOD WITH AN ASCENDING TUBE

(71) Applicant: ALPLA Werke Alwin Lehner GmbH & Co. KG, Hard (AT)

(72) Inventor: Gerold Spiegel, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 399 days.

(21) Appl. No.: 13/799,189

(22) Filed: Mar. 13, 2013

(65) Prior Publication Data

US 2013/0239675 A1 Sep. 19, 2013

(30) Foreign Application Priority Data

Mar. 13, 2012 (CH) ........................................ 361/12

(51) Int. Cl.
*G01B 13/10* (2006.01)
*G01F 7/00* (2006.01)
*G01M 99/00* (2011.01)

(52) U.S. Cl.
CPC ............... *G01F 7/00* (2013.01); *G01M 99/008* (2013.01)

(58) Field of Classification Search
None
See application file for complete search history.

(56) References Cited

U.S. PATENT DOCUMENTS

| | | | | |
|---|---|---|---|---|
| 3,534,435 | A * | 10/1970 | John | 425/524 |
| 6,213,358 | B1 * | 4/2001 | Libit et al. | 222/633 |
| 7,047,802 | B2 * | 5/2006 | Seys et al. | 73/168 |
| 7,325,440 | B2 * | 2/2008 | Minamitani et al. | 73/37.9 |

* cited by examiner

*Primary Examiner* — Robert R Raevis
(74) *Attorney, Agent, or Firm* — Buchanan Ingersoll & Rooney PC

(57) ABSTRACT

An exemplary method and apparatus for function testing of plastic containers which have been produced in an extrusion blow molding method and include an ascending tube. The apparatus being configured to determine the flow rate of a fluid medium through the ascending tube. The determined flow rate is compared to a set flow rate range, and when upper and lower boundaries for the flow rate are not reached or are exceeded, the container is excluded from further processing and removed from the process.

19 Claims, 3 Drawing Sheets

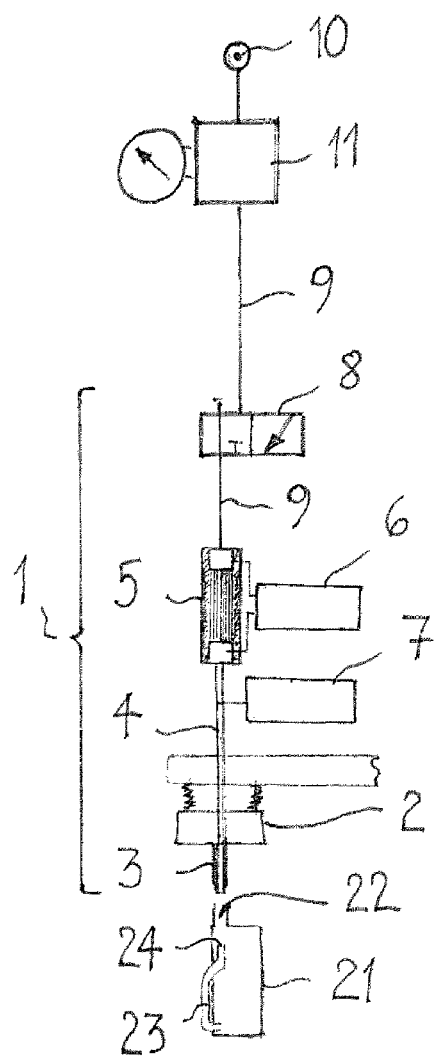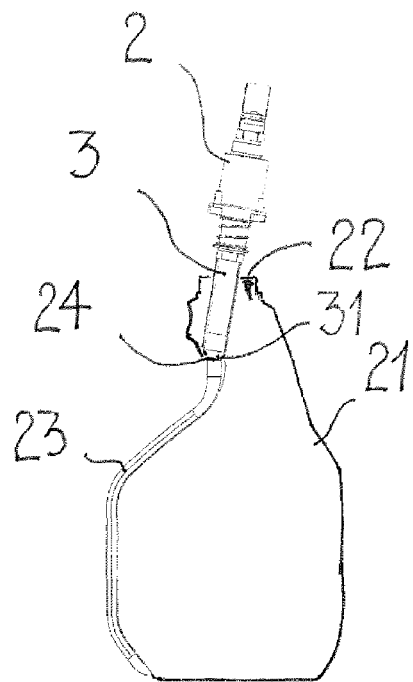
Fig. 2
Fig. 1

METHOD AND APPARATUS FOR FUNCTION TESTING OF PLASTIC CONTAINERS PRODUCED IN AN EXTRUSION BLOW MOLDING METHOD WITH AN ASCENDING TUBE

RELATED APPLICATION(S)

This application claims priority under 35 U.S.C. §119 to Swiss Application 0361/12 filed in Switzerland on Mar. 13, 2012, the entire content of which is hereby incorporated in its entirety by reference.

FIELD

The present disclosure relates to a method for function testing of plastic containers produced in an extrusion blow molding method, with an ascending tube, and a test apparatus which is suitable for carrying out the extrusion blow molding method as claimed in the invention.

BACKGROUND INFORMATION

Known containers of tin plate or nonferrous sheet metal, of glass or also of ceramic are being increasingly displaced by plastic containers. In the meantime, plastic containers are used for the packaging of fluid substances, for example of beverages, household products, care products, cosmetics, etc. The low weight and lower costs can play a substantial role in the consideration of using a plastic container. The use of recyclable plastic materials and the altogether more favorable total energy balance in their manufacture can also contribute to promoting the acceptance of plastic containers, such as plastic bottles, among consumers.

The production of plastic containers, such as plastic bottles, for example from polyethylene or polypropylene, often takes place in an extrusion blow molding method, such as a method of extrusion of blown tubing. Here single-layer or multi-layer plastic tubing is extruded with an extrusion head, placed in the mold cavity of a blow molding tool and is inflated by a blowing medium, for example air, which has been delivered into the blow mold with overpressure, according to the mold cavity. Afterwards the inflated plastic container can be cooled and removed from the mold.

The extrusion blow molding method allows the production of plastic containers, such as plastic bottles, with the most varied forms. In the manner apportioning bottles can be produced which have a plastic container with an ascending tube molded thereon. The ascending tube runs along one outside wall of the container. In the bottom region, the ascending tube discharges into the interior of the container and extends from the bottom of the container to an apportioning chamber which is made integrally with the container. The ascending tubes of these apportioning bottles have a comparatively large diameter and are not a difficulty in production.

Spray bottles which are sufficiently known from the prior art also have a container which can be produced in an extrusion blow molding method. A separately produced spray head which is placed (e.g., screwed) on the container neck, is equipped with a spray nozzle. The spray nozzle is connected to a thin ascending tube which is mounted on the spray head and which extends into the interior of the container as far as its bottom. The ascending tube is likewise a separate part which is connected to the spray head in a separate mounting step. The ascending tube can have a greater length than corresponds to the height of the container in order to enable emptying of the container. In practice, a spray bottle can often not be completely emptied in spite of the ascending tube which extends to the bottom, and depending on the location of the inlet opening of the ascending tube on the bottom of the container, the spray bottle should be held in a quite certain position with increasing emptying. It has therefore also been suggested that the container of a spray bottle depending on the configuration of apportioning bottles be provided with an ascending tube which runs along an outside wall of the container. The apportioning head is then mounted on the container neck such that a connection forms between the apportioning nozzle and the ascending tube. The ascending tube is formed integrally with the plastic container in the extrusion blow molding method. The inner cross section of the ascending tube at its narrowest point is roughly 3 mm 2-5 mm$^2$ and should not exceed roughly 20 mm$^2$. For later reliable operation of the spray bottle the ascending tube of the plastic container should not be less than the minimum internal cross section. On the other hand, the internal cross section of the ascending tube should not be too large since this can likewise influence the later operation of the spray bottle.

SUMMARY

An exemplary method for function testing of plastic containers having an ascending tube and produced in an extrusion blow molding process is disclosed, the method comprising: determining flow rate of a fluid medium through the ascending tube; comparing the flow rate to a set flow rate range; and when the flow rate is outside of upper and lower boundaries of the flow rate range, excluding the plastic container from further processing by removing the container from the molding process.

An exemplary test apparatus for function testing of plastic containers, each container having an ascending tube and being produced through an extrusion blow molding method is disclosed, the apparatus comprising: a test head configured to establish a pressure-tight connection with the ascending tube; and an evaluation unit configured to evaluate pressure differences measured between a flow rate in the ascending tube and a predetermined flow rate range.

An exemplary method of function testing of plastic containers having an ascending tube is disclosed, comprising: executing an extrusion blow molding process to form a plastic container, during the blow molding process: determining a flow rate of a fluid flowing through the ascending tube; comparing the flow rate to a predetermined flow rate range; and removing the container from the blow molding process when the determined flow rate is outside of the flow rate range.

BRIEF DESCRIPTION OF THE DRAWINGS

Other advantages and features of the invention will become apparent from the following description of the method and of the test apparatus with reference to the schematics. The figures are not to scale.

FIG. 1 shows a schematic of an arrangement for an extrusion blow molding test method in accordance with an exemplary embodiment of the present disclosure;

FIG. 2 shows a plastic container with an ascending tube and a mounted test head in accordance with an exemplary embodiment of the present disclosure;

DETAILED DESCRIPTION

Figure 3:
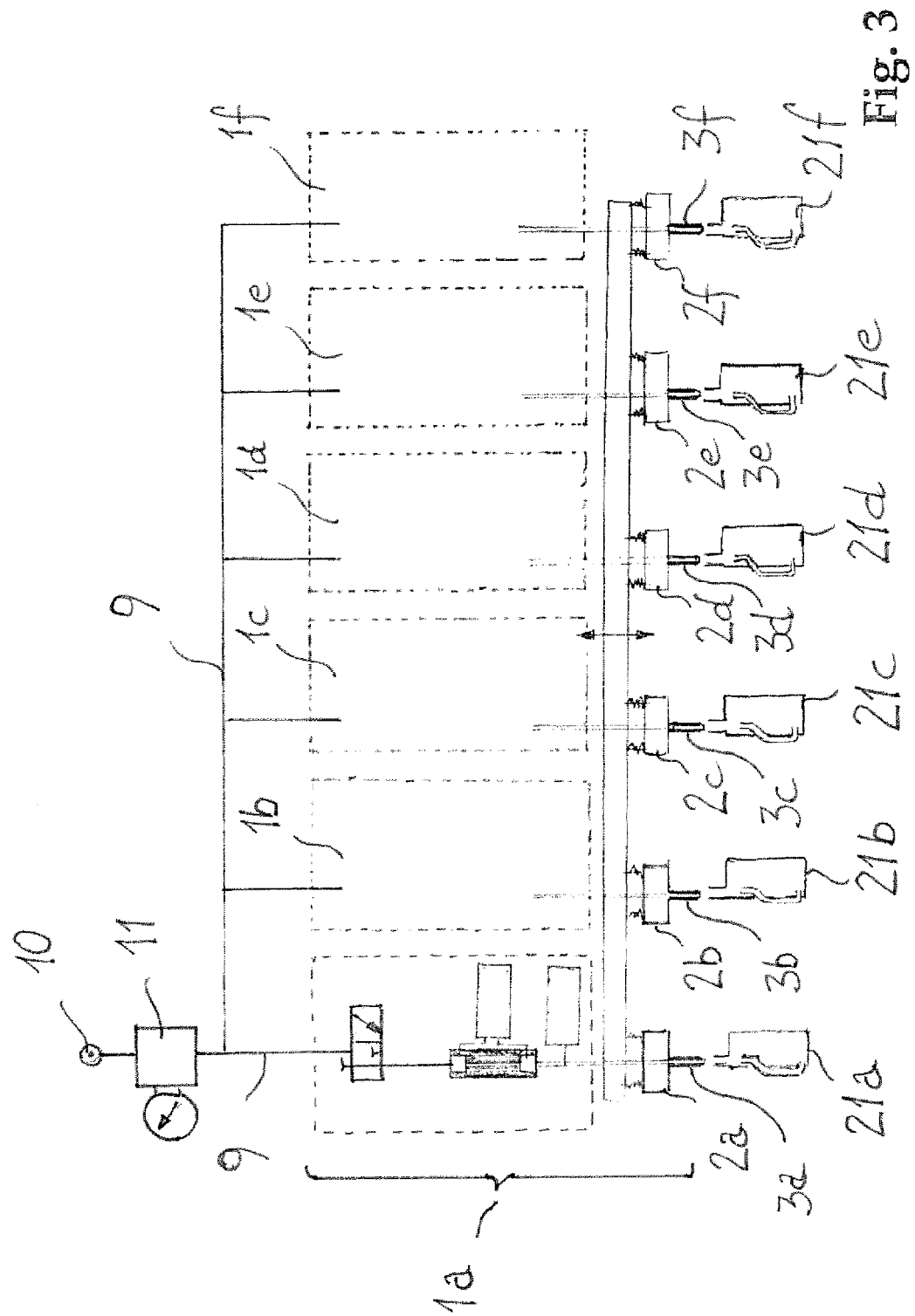
FIG. 3 shows a schematic of a test apparatus for simultaneous testing of several containers in accordance with an exemplary embodiment of the present disclosure.

Exemplary embodiments of the present disclosure ensure that only plastic containers whose ascending tube has an internal cross section which is within the specifications are forwarded to the other processing stations (e.g., filling, mounting of the spray head).

The aforementioned results can be achieved in a method for testing of plastic containers which have been produced in an extrusion blow molding method with an ascending tube which runs on one outside wall.

The exemplary embodiments disclosed herein provides a method for function testing of plastic containers produced in an extrusion blow molding method, with an ascending tube in which the flow rate of a fluid medium through the ascending tube is determined, is compared to a set flow rate region (e.g. range), and when upper and lower boundaries for the flow rate range are not reached or are exceeded, the container is excluded from further processing and removed from the process.

By all containers being tested before further processing, for example, filling and mounting of the spray head, those with overly low flow rate or overly large flow rate through the ascending tube can be removed. Defectively operating or defective spray bottles can thus be reliably prevented. It goes without saying that in conjunction with a large-scale technical method such as the extrusion blow molding method with high throughput the testing of the containers takes place automatically. The ascending tube is used for passage of a liquid medium. For reasons of speed of the measurement method and for the sake of better capacity to be integrated into the production process, the flow rate through the ascending tube is determined with compressed air. There can be compressed air ports at almost all production sites so that separate installations or additional equipment are not necessary for this purpose.

In an exemplary embodiment of the disclosed method the flow rate through the ascending tube can be determined using a laminar flow element. Laminar flow elements are among the so-called linear devices and in contrast to classic, primarily seal-dependent differential pressure transducers with a square root relationship between the flow rate and the differential pressure, they have an almost linear characteristic of the flow rate and differential pressure. In this way, they have a very large usable measurement range in which direct evidence about the flow rate of a test piece can be obtained. Due to their very prompt response times laminar flow elements can be well suited for use in conjunction with large-scale technical methods with high production output, such as is constituted for example by the extrusion blow molding method.

The exemplary measurement method of the present disclosure is carried out advantageously such that the laminar flow element in overpressure operation is flooded with a constant pressure and a pressure difference between the input and the output of the laminar flow element is evaluated and compared to the lower and upper boundaries of the set flow rate region (e.g., range). In overpressure operation of the laminar flow element the air flows out freely against the atmosphere. In another exemplary embodiment, the vacuum pump can be abandoned in the intake operation of the laminar flow element.

The lower and upper boundaries for the set flow rate region (e.g., range) can be suitably empirically established. By the lower and upper boundaries for the set flow rate region (e.g., range) being automatically adapted to the respective ambient conditions and being adaptively tracked automatically, there is largely independence of the calibration and setting of a reference value. The result of the testing of the flow rate is then simply an assessment "poor", e.g., the flow rate is too low or too high, or "good", when the measured flow rate value is within a valid window.

In an exemplary embodiment of the present disclosure a plastic container is transported to a testing station, stopped there and held in position by means of a mask. Afterwards a test head is placed on the neck opening of the container such that the ascending tube can be pressurized with the fluid medium. When this has taken place, the testing is initiated and carried out.

According to another exemplary embodiment of the present disclosure regarding high outputs of an extrusion blow molding method, it is useful if several plastic containers are tested at the same time with respect to the flow rate through the ascending tube.

In yet another exemplary embodiment of the present disclosure testing of the flow rate through the ascending tube of each plastic container to take place immediately following the extrusion blow molding process. This process guidance takes into account the circumstance that the plastic containers are often produced directly on site, e.g., directly upstream of the filling station.

An exemplary test apparatus of the present disclosure for function testing of plastic containers produced in an extrusion blow molding method with an ascending tube includes a test head which is made for establishing a pressure-tight connection between the test head and the ascending tube, and an evaluation unit for the measured pressure differences. The test apparatus can be made to be space-saving and can therefore be integrated very easily into the production process of plastic containers which are further processed immediately following their production, e.g., filled and provided with a spray head.

Another exemplary test apparatus of the present disclosure calls for the test head to be made as a multiple test head with several testing units for the simultaneous function testing of several containers. Here each testing unit is assigned to one container and can be evaluated separately. A multiple test head can be better matched to the high output of the extrusion blow molding method.

According to an exemplary embodiment of the present disclosure each test head or each testing unit includes a laminar flow element. Laminar flow elements are among the so-called linear devices and in contrast to classic, primarily seal-dependent differential pressure transducers with a square root relationship between the flow rate and the differential pressure, have an almost linear characteristic of the flow rate and differential pressure. As a result, the devices can have a very large usable measurement range in which direct evidence about the flow rate of a test piece can be obtained. Due to their very prompt response times laminar flow elements can be well suited for use in conjunction with large-scale technical methods with high production output, such as is constituted for example by the exemplary extrusion blow molding method.

The exemplary evaluation unit of the test apparatus can be made to be automatically adaptive. Only when the test apparatus is started up can reference values be input and the flow rate of the empty test apparatus is used as a first reference value and a blocked flow rate as a second reference value.

FIG. 1 shows a schematic of an arrangement for an extrusion blow molding test method in accordance with an exemplary embodiment of the present disclosure. In the schematic shown in FIG. 1 for measurement of the flow rate of a fluid medium through an ascending tube of a plastic container which has been produced in an extrusion blow molding method, a schematically suggested test apparatus is labeled 1 overall. The test apparatus 1 includes an elastically supported test head 2 with a test pipe 3. The test pipe 3 is made such that it can be placed on a mouth 24 of an ascending tube 23, forming a seal, through the opening 22 of the plastic container 21. The test head 2 can be connected to a laminar flow element 5 via a line 4. A feed line 9 connects the laminar flow element 5 to a compressed air source 10 whose pressure can be set via a pressure regulator 11. The inlet and outlet of the laminar flow element 5 are connected to a differential pressure sensor 6. A pressure sensor 7 in the line 4 between the laminar flow element 5 and the test head 2 is used to measure the air pressure with which the ascending tube 23 is pressurized during the testing of the flow rate. There can be a sequence valve 8 upstream of the inlet into the laminar flow element 5.

FIG. 2 shows a plastic container with an ascending tube and a mounted test head in accordance with an exemplary embodiment of the present disclosure. FIG. 2 schematically shows a test head 2 which has been placed on the mouth 24 of the ascending tube 23 of a plastic container 21. For this purpose the test pipe 3 can be inserted through the opening 22 of the plastic container 21 until a cone or radius 31 which is provided on the free end of the test pipe 3 seals the mouth 24 of the ascending tube 23.

To test the flow rate, the test piece, e.g., the ascending tube 23, is pressurized with air, and can be operated like a supercritical (e.g., highly pressurized) nozzle. In this way the speed of sound is established on the smallest cross section of the ascending tube 23. As a result, the volumetric flow at the inlet of the ascending tube 23 is almost independent of the inlet and outlet absolute pressure and is determined mainly by the cross sectional area at the narrowest point of the ascending tube 23. For function testing of the ascending tube 23 it can be sufficient to measure the pressure difference between the inlet and outlet of the laminar flow element 5 since it depicts the flow rate through the ascending tube 23. It is not the absolute value of the flow rate which is evaluated for the function testing. Only a comparison to the empirical values is carried out. The evaluation unit of the test apparatus 1 can be made to be automatically adaptive. Only when the test apparatus 1 is started up can the reference values be input and the flow rate of the empty test apparatus be used as a first reference value and a blocked flow rate as a second reference value. The result of the function testing is then the assessment "poor", e.g., the flow rate is too small or too large, and "good" when the value is within a valid window.

FIG. 3 shows a schematic of a test apparatus for simultaneous testing of several containers in accordance with an exemplary embodiment of the present disclosure. Namely, FIG. 3 shows a schematic of a test apparatus 1a-1f for the simultaneous function testing of several plastic containers 21a-f. Here each of the test apparatus 1a-1f has the same structure as the test apparatus of the exemplary embodiment shown in FIG. 1. For the simultaneous function testing of several plastic containers 21a-21f there is a corresponding number of test heads 2a-2f which each have a test pipe 3a-3f which is placed on the mouth of the ascending tube of the respective plastic container 21a-21f, forming a seal, for the function testing. The test heads 2a-2f of the test apparatus 1a-1f are elastically suspended on a common support and form a multiple test head. They are connected via a common feed line 9 to a compressed air source 10 which can be adjusted via a pressure regulator 11. This test apparatus 1a-1f with a multiple test head 2a-2f is designed, for example, for use following an extrusion blow molding device with a multiple tool.

Figure 4:
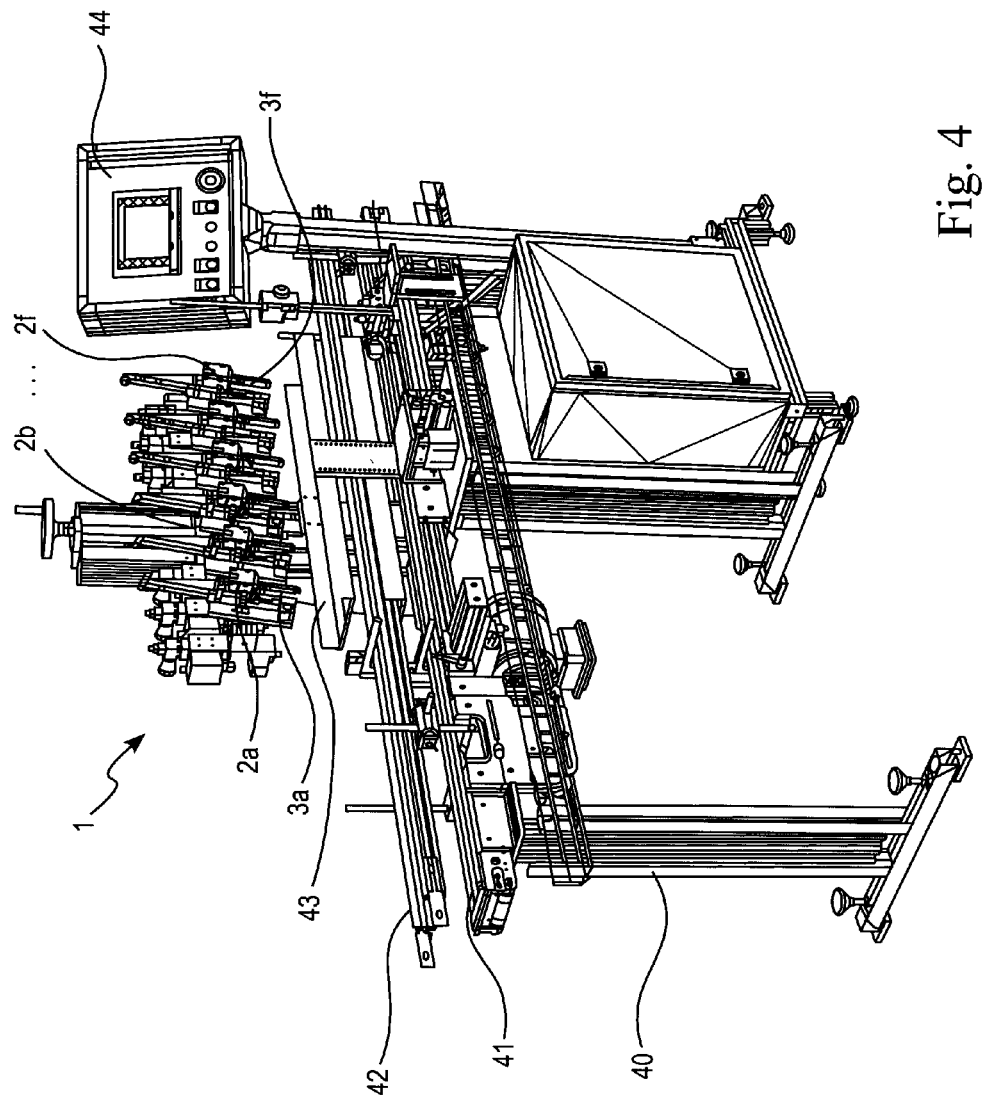
FIG. 4 shows a perspective of a multiple test apparatus in accordance with an exemplary embodiment of the present disclosure.

FIG. 4 shows a perspective of a multiple test apparatus in accordance with an exemplary embodiment of the present disclosure. FIG. 4 show a perspective view of one version of a test apparatus for the simultaneous function testing of several plastic containers, which is labeled with reference number 1 overall. The test apparatus which is labeled 1 overall stands for the individual testing units 1a-1f as are schematically suggested in FIG. 3. The test apparatus includes test heads 2a, 2b-2f which can be combined into a multiple test head. From each test head a test pipe 3a-3f projects which is inserted into the neck of the plastic container for function testing through the opening and is brought into contact with the mouth of the ascending tube, forming a seal, in order to pressurize it with compressed air. The multiple test head 2a-2f is connected to a compressed air source via a feed line which is not shown. The test apparatus can be attached to a frame 40 which has transport means 41 and guide rails 42 for the plastic containers. A mask 43 which is located above the transport means 41 and guide rails can be vertically adjusted relative to the transport plane and is used for positioning of the plastic containers with reference to the multiple test head 2a-2f. For purposes of function testing, the test pipes 3a-3f can be fed onto the plastic containers. The multiple test head 2a-2f is connected to an evaluation unit 44 which evaluates the measurement data in a manner specific to the test head. Plastic containers whose ascending tubes do not reach the specified minimum flow rate are automatically removed following the function test. The removal apparatus which can be moved laterally and which are used for this purpose are not detailed, for reasons of better clarity.

The entire test system is advantageously made such that it can be easily integrated into a transport system for the plastic containers which have been produced following an extrusion blow molding device. As a result immediately after removal of the plastic containers from the blow molding tool which can be a multiple tool, the function testing can take place as claimed in the invention. Plastic containers which do not pass the function test are removed. The plastic containers which are found to be satisfactory can be further transported to other processing stations, such as to a filling unit.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for function testing of plastic containers during a manufacturing process, each plastic container having an ascending tube, the method comprising:
    determining flow rate of a fluid medium through at least one ascending tube of a respective plastic container;
    comparing the flow rate to a set flow rate range to determine whether the flow rate is outside of upper and lower boundaries of the flow rate range; and
    excluding the plastic container associated with the at least one ascending tube from further processing by removing the plastic container from the molding process when the flow rate is outside of the upper and lower boundaries of the flow rate range.

2. The method as claimed in claim 1, wherein the determination of the flow rate through the at least one ascending tube takes place with compressed air.

3. The method as claimed in claim 2, wherein the determination of the flow rate through the at least one ascending tube takes place using a laminar flow element.

4. The method as claimed in claim 3, comprising:
flooding the laminar flow element in overpressure operation with a constant pressure,
wherein the step of determining the flow rate through the at least one ascending tube includes determining a flow rate through the laminar flow element, and
wherein the step of comparing the flow rate to a set flow rate range includes comparing the determined flow rate through the laminar flow element to the lower and upper boundaries of the set flow rate range.

5. The method as claimed in claim 4, wherein the lower and upper boundaries for the set flow rate range are empirically established.

6. The method as claimed in claim 5, comprising:
automatically adapting the lower and upper boundaries for the set flow rate range to respective ambient conditions; and
adaptively tracking the lower and upper boundaries for the set flow rate range automatically.

7. The method as claimed in claim 1, comprising:
stopping and holding in position a plastic container transported to a testing station by means of a mask;
placing a test head on the neck opening of the container such that the at least one ascending tube can be pressurized with the fluid medium; and
initiating and carrying out the function testing.

8. The method as claimed in claim 7, wherein the at least one ascending tube includes several ascending tubes each associated with a respective plastic container, each plastic container is tested simultaneously with respect to a flow rate through the associated ascending tube.

9. The method as claimed in claim 7, wherein the testing of the flow rate through the at least one ascending tube of each plastic container takes place immediately following an extrusion blow molding process.

10. A test apparatus for function testing of plastic containers, each container having an ascending tube and being produced through an extrusion blow molding method of a manufacturing process, the apparatus comprising:
a test head configured to establish a pressure-tight connection with at least one ascending tube;
a laminar flow element connected to the test head;
a differential pressure sensor connected across the laminar flow element; and
an evaluation unit configured to evaluate pressure differences, which are output by the differential pressure sensor, of a flow rate in the at least one ascending tube and a predetermined flow rate range.

11. The test apparatus as claimed in claim 10, wherein the test head includes a plurality of testing units for simultaneous function testing of several containers, each testing unit being assigned to one container and configured to be evaluated separately.

12. The test apparatus as claimed in claim 10, wherein the evaluation unit is configured to be automatically adaptive for setting upper and lower boundaries of the flow rate range.

13. A method of function testing and sorting of plastic containers during a manufacturing process, each plastic container being formed through a blow molding process and having an ascending tube, the method comprising:
determining a flow rate of a fluid flowing through the ascending tube;
comparing the flow rate to a predetermined flow rate range; and
removing the at least one plastic container from the blow molding process when the determined flow rate is outside of the flow rate range.

14. The method as claimed in claim 13, wherein the step of determining the flow rate through the ascending tube takes place with compressed air.

15. The method as claimed in claim 14, wherein the step of determining the flow rate through the ascending tube includes using a laminar flow element.

16. The method as claimed in claim 15, comprising:
flooding the laminar flow element in overpressure operation with a constant pressure,
wherein the step of determining the flow rate through the at least one ascending tube includes determining a flow rate through the laminar flow element, and
wherein the step of comparing the flow rate to the predetermined flow rate range includes comparing the determined flow rate through the laminar flow element to lower and upper boundaries of the predetermined flow rate range.

17. The method as claimed in claim 16, wherein the lower and upper boundaries of the predetermined flow rate range are empirically established.

18. The method as claimed in claim 17, comprising:
automatically adapting the lower and upper boundaries of the predetermined flow rate range to respective ambient conditions; and
adaptively tracking the lower and upper boundaries of the predetermined flow rate range automatically.

19. The method as claimed in claim 13, comprising:
stopping and holding in position the at least one plastic container transported to a testing station by means of a mask; and
placing a test head on a neck opening of the at least one plastic container such that the ascending tube can be pressurized with the fluid.

* * * * *